United States Patent Office 3,092,609
Patented June 4, 1963

3,092,609
STABILIZER FOR STYRENE-ACRYLONITRILE COPOLYMERS
Oscar Kostelitz, Paris, and Georges Wetroff, Le Thillay, France, assignors to Pechiney Compagnie de Produits Chimiques et Electrometallurgiques, Paris, France
No Drawing. Filed Aug. 27, 1959, Ser. No. 836,326
Claims priority, application France Aug. 28, 1958
1 Claim. (Cl. 260—45.9)

The present invention relates to a process for stabilizing aromatic polymers, particularly styrene-acrylonitrile copolymers.

It is well known that one of the disadvantages of aromatic polymers is that they are degraded in time by heat and light, the time of degradation being dependent on the severity of the conditions of use. This problem is particularly acute with styrene-acrylonitrile polymers and increases in proportion to the acrylonitrile content.

It is also known that certain amines stabilize aromatic polymers such as polystyrene, while others have no effect or even a negative effect. Recently, a diamine derivative, namely N,N,N'N' - tetrakis (2 - hydroxypropyl) ethylene-diamine, has been claimed as a stabilizer for styrene-acrylonitrile copolymers. However, actual practice has revealed that the amino-stabilizers, as proposed up to now, are not completely satisfactory. For example, it has been noted that ethanolamines are almost completely ineffective in contrast to what would have been expected on the basis of previous work.

An object of the present invention, therefore, is to provide a new type of compound which stabilizes aromatic polymers, particularly against the degrading action of heat and light.

Another object is to use these compounds to stabilize styrene-acrylonitrile copolymers in particular.

Other objects of the present invention will become apparent upon further study of the specification and appended claims.

To accomplish the objects of this invention, applicants have discovered that certain compounds having at least one 2-hydroxypropyl group connected to one or several nitrogen atoms are especially effective stabilizers.

Thus, the present invention is directed to the discovery and use, as a stabilizer, of new compounds characterized by the formula

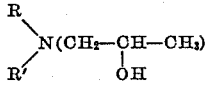

wherein R may be an organic radical such as alkyl $CH_3—(CH_2)_n—$;
aryl, e.g. $C_6H_5—$;
alkenyl, e.g. $CH_2=CH—(CH_2)_n—$;
hydroxyalkyl, e.g. $CH_3—CHOH.(CH_2)_n—$;
amino alkyl, e.g. $H_2N—CH_2—$;
polyamino alkyl, e.g.
$H_2N(CH_2)_nNH(CH_2)_mNH(CH_2)_pCH_2—$ etc., $n$, $m$ and $p$ being integral numbers generally between 1 and 20 and preferably between 1 and about 5. In all cases, R' may be hydrogen or one of the organic radicals cited above. R and R' may be identical except in the case where R is a $CH_3—CHOH—CH_2$ group.

When the substituents R or R' are comprised of amine groups, the hydrogens of these groups may be replaced, entirely or partly, by 2-hydroxypropyl groups. However, where there are 2 nitrogen atoms in a molecule, no more than a total of three 2-hydroxypropyl groups can be incorporated in said molecule, as with four 2-hydroxypropyl groups, the resulting compound is extremely diffi- cult to blend or mix into a styrene-acrylonitrile copolymer.

The 2-hydroxypropylamines, generally non-volatile, sirupy liquids, are introduced into the polymer either in pure form or in a solvent solution, the solvent being subsequently eliminated by vaporization. The percentage of stabilizer is generally minor, for example between 0.1 and 5%, the best results being obtained with amounts of stabilizer between 0.5 and 2%.

The preferred and most efficient stabilizer contains an alkenyl group, and this is considered most unexpected in view of the reactive nature of the double bond.

One practical method for obtaining these new 2-hydroxypropylamines involves the condensation of propylene oxide with the corresponding amine.

The following examples are intended to illustrate this invention without being limitative of the appended claims.

The copolymer of styrene and acrylonitrile referred to in the examples is comprised of 70 parts styrene and 30 parts acrylonitrile, but the stabilizer will be of great benefit to copolymers of all proportions, e.g. 20–35% acrylonitrile.

Example I

N,N,N',N',N''-pentakis(2 - hydroxypropyl) - diethylenetriamine is prepared according to the reaction:

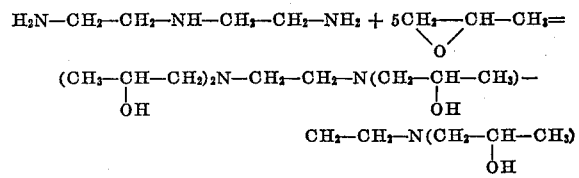

192 parts propylene oxide, corresponding to an excess of 10%, are introduced into a mixture of 62 parts diethylenetriamine and 400 parts water while stirring at 20° C. during a period of 1 hour 40 minutes. The temperature is kept at 20° C. for the duration of the introduction and then for 2 to 10 hours; after the prolonged isothermal residence time, the mixture is heated to 130° C. under pressure of 20 mm. mercury in order to eliminate the water and the excess of propylene oxide. The residue of this operation consists of 236 parts of a very viscous liquid having a light yellow color. The yield is practically quantitative;

$$d_{20° C.}^{20° C.}=1.0425, n_{20° C.}=1.484$$

A composition of 1% of this product is mixed with 99% of styrene-acrylonitrile copolymer in a malaxator (e.g. rubber mill, banbury mixer). Small plates are then prepared and heated to 250° C. in an oven, where they are kept for 30 minutes. After this severe heat treatment, these plates are compared to those made from an untreated copolymer, processed in the same manner. It is noted that the samples containing the stabilizer have remained practically colorless, whereas the samples which were not treated have a definite light yellow color.

Example II

N,N-bis(2 - hydroxypropyl) - allylamine is prepared according to the following reaction:

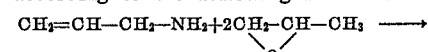
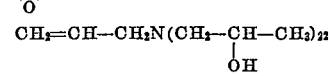

256 parts propylene oxide, corresponding to an excess of 10%, are introduced into a mixture of 114 parts allylamine and 300 parts water serving as a solvent while stirring for 1 hour 10 minutes. The temperature is kept at 20° C. for the duration of the introduction and then for 2 to 10 hours; after this prolonged isothermal reaction, the mixture is heated to 130° C. under a pressure of 20 mm. mercury to eliminate the water and excess propylene oxide. As distillation residue, 335 parts of a colorless, viscous liquid product are obtained, having the following characteristics:

$$d\frac{20°\text{ C.}}{20°\text{ C.}} = 0.9567, n_{20°\text{ C.}} = 1.4631$$

This product, having a double bond, may also be copolymerized with the monomers, if desired. The styrene-acrylonitrile copolymer stabilized with 1% of this product does not show any color after having been heated at 250° C. for 30 minutes. It is apparent that the allyl compound of this example achieves remarkable success and that it will be apparent that it is the best of all the examples.

*Example III*

N(2-hydroxypropyl)-aniline is prepared according to the following reaction:

64 parts propylene oxide, corresponding to an excess of 10% are introduced into a mixture of 93 parts aniline, freshly fractionated in the presence of zinc powder, and 650 parts methanol, while stirring for 45 minutes. The temperature is kept at 20° C. for the period of introduction and then for 2 to 10 hours; then the excess propylene oxide and solvent are eliminated by distillation, initially at atmospheric pressure, and, towards the end, under a pressure of 20 mm. mercury. As distillation residue, 146.5 parts N-2-hydroxypropyl-aniline are obtained. The yield is of 97%.

$$d\frac{20°\text{ C.}}{20°\text{ C.}} = 1.0612, n_{20°\text{ C.}} = 1.5595$$

The styrene-acrylonitrile copolymer stabilized with 1% of this product and heated for 30 minutes at 250° C. is somewhat lightly yellow, which shows that this product is slightly inferior, compared to the products of the preceding examples.

For another comparison, the copolymer was mixed with the reaction product of aniline and ethylene oxide, and heated as above. The results showed that this latter product did not have any stabilizing action on the copolymer, and thus it is conclusively shown that the use of propylene oxide instead of ethylene oxide in preparing the stabilizer gives rise to new and unexpected results.

*Example IV*

N,N-bis(2-hydroxypropyl)-aniline is prepared according to Example III, but with a double weight of propylene oxide and while refluxing the reaction mixture for 8 hours at 80° C. After distillation of the methanol and excess propylene oxide, a distillation residue consisting of 181 parts of a viscous liquid are obtained the physical properties of which are as follows:

$$d\frac{20°\text{ C.}}{20°\text{ C.}} = 1.0455, n_{20°\text{ C.}} = 1.5545$$

The yield is 86%.

The test of the product as a stabilizer for the styrene-acrylonitrile copolymer classifies it as poorer than the first two examples, but better than the third example.

*Example V*

N,N-bis(2-hydroxypropyl)-butylamine is prepared according to the following reaction:

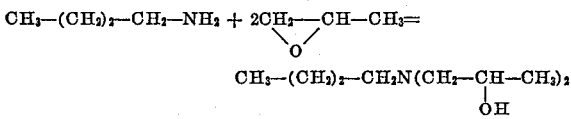

256 parts propylene oxide, corresponding to an excess of 10%, are introduced into a mixture of 146 parts butylamine and 700 parts water while stirring and for a period of one hour. The temperature is kept at 20° C. for the time of introduction and an additional 2 to 10 hours; one then heats to 130° C. under a pressure of 20 mm. to eliminate the water and excess propylene oxide. The residue consists of 359 parts of a colorless viscous liquid the properties of which are:

$$d\frac{20°\text{ C.}}{20°\text{ C.}} = 0.9289, n_{20°\text{ C.}} = 1.4506$$

The yield is about 95%.

The same test as conducted in the preceding examples showed that the stabilizing power of this product is very slightly inferior to the products of the first two examples, but is superior to the producs derived from aniline.

The stabilizers of this invention are also useful in the compounding of all aromatic polymers such as polystyrene, polyesters of an aromatic-containing acid or alcohol, such as the polyester of terephthalic acid and ethylene glycol, phenol-formaldehyde polymers, styrene-butadiene copolymers, styrenated polyesters, etc.

It is also apparent that in those cases where it is desired to stabilize any acrylonitrile-containing polymer, the compounds of this invention will be of great value.

It is understood that the inventors intend to claim, as a part of their invention, any variation, substitution and changes that lie within the scope of the invention and the hereinafter appended claims and intend to include within the scope of said claims such changes as may be apparent to those skilled in the art in the practice of the principles of this invention and within the scope as set forth in the hereinabove-stated specification.

It will be understood that the invention is susceptible to modification in order to adapt it to different usages and conditions, and, accordingly, it is desired to comprehend such modifications within the invention as may fall within the scope of the appended claim.

What we claim is:

A composition of matter the essential constituents of which are a styrene-acrylonitrile copolymer and, as a stabilizing agent, from 0.1 to 5%, based on the weight of copolymer, of N,N-bis(2-hydroxypropyl)allylamine.

References Cited in the file of this patent

UNITED STATES PATENTS

| | | |
|---|---|---|
| 1,476,934 | Volwiler et al. | Dec. 11, 1923 |
| 2,172,822 | Tamele et al. | Sept. 12, 1939 |
| 2,287,188 | Matheson et al. | June 23, 1942 |
| 2,334,517 | Tucker | Nov. 16, 1943 |
| 2,649,483 | Huscher et al. | Aug. 18, 1953 |
| 2,681,328 | Stanton et al. | June 15, 1954 |
| 2,700,686 | Dickey et al. | Jan. 25, 1955 |
| 2,732,366 | Tubbs et al. | Jan. 24, 1956 |
| 2,733,262 | Britton et al. | Jan. 31, 1956 |
| 2,864,775 | Newey | Dec. 16, 1958 |
| 2,878,232 | Schweitzer | Mar. 17, 1959 |
| 2,938,882 | Schweitzer | May 31, 1960 |
| 2,965,685 | Campbell | Dec. 20, 1960 |